United States Patent [19]

Davidovici

[11] Patent Number: 5,802,102
[45] Date of Patent: *Sep. 1, 1998

[54] PROGRAMMABLE TWO-PART MATCHED FILTER FOR SPREAD SPECTRUM

[75] Inventor: Sorin Davidovici, Jackson Heights, N.Y.

[73] Assignee: Golden Bridge Technology, Inc., West Long Branch, N.J.

[*] Notice: The term of this patent shall not extend beyond the expiration date of Pat. No. 5,627,855.

[21] Appl. No.: 821,003

[22] Filed: Mar. 20, 1997

Related U.S. Application Data

[63] Continuation of Ser. No. 450,312, May 25, 1995, Pat. No. 5,627,855.

[51] Int. Cl.$^6$ .............................. H04B 1/707; H04L 27/22
[52] U.S. Cl. ...................... 375/207; 375/206; 375/343; 364/724.11
[58] Field of Search .......................... 375/206, 207, 375/343, 200; 364/724.11

[56] References Cited

U.S. PATENT DOCUMENTS

| | | | |
|---|---|---|---|
| 4,112,372 | 9/1978 | Holmes et al. | 325/321 |
| 4,418,393 | 11/1983 | Zscheile, Jr. | 364/724 |
| 4,426,630 | 1/1984 | Folkmann | 333/174 |
| 4,583,048 | 4/1986 | Gumacos et al. | 375/343 |
| 4,630,283 | 12/1986 | Schiff | 375/1 |
| 4,653,069 | 3/1987 | Roeder | 380/31 |
| 4,660,164 | 4/1987 | Leibowitz | 364/728 |
| 4,672,658 | 6/1987 | Kavehrad et al. | 379/63 |
| 4,691,326 | 9/1987 | Tsuchiya | 375/1 |
| 4,707,839 | 11/1987 | Andren et al. | 375/1 |
| 4,730,340 | 3/1988 | Frazier, Jr. | 375/1 |
| 4,755,983 | 7/1988 | Masak et al. | 370/6 |
| 4,759,034 | 7/1988 | Nagazumi | 375/1 |
| 4,860,307 | 8/1989 | Nakayama | 375/1 |
| 4,912,722 | 3/1990 | Carlin | 375/1 |
| 4,969,159 | 11/1990 | Belcher et al. | 375/1 |
| 5,031,192 | 7/1991 | Clark | 375/343 |
| 5,311,544 | 5/1994 | Park et al. | 375/206 |

OTHER PUBLICATIONS

J.H. Cafarella, W.M. Brown, E. Stern and J.A. Alusow, "Acoustoelectric Coovolvers for Programmable Matched Filtering in Spread–Spectrum Systems," Proceedings of the IEEE, vol. 64, No. 5, pp. 756–759.

*Primary Examiner*—Stephen Chin
*Assistant Examiner*—Jeffrey W. Gluck
*Attorney, Agent, or Firm*—David Newman

[57] ABSTRACT

A spread-spectrum-matched-filter apparatus including a code generator, a programmable-matched filter, a frame-matched filter, and a controller. The code generator generates replicas of a pilot-chip-sequence signal and a data-chip-sequence signal, which are used to set the programmable-impulse response of the programmable-matched filter. The programmable-impulse response is alternately changed between that of the pilot-chip-sequence signal and the data-chip-sequence signal so that the programmable-matched filter alternately detects the pilot-spread-spectrum channel and the data-spread-spectrum channel embedded in a received spread-spectrum signal. The frame-matched filter detects a despread-pilot-bit-sequence signal and generates a peak-pilot-correlation signal which can be used for timing of the controller as to when to trigger changing the programmable-impulse response of the programmable-matched filter.

12 Claims, 3 Drawing Sheets

PROGRAMMABLE TWO-PART MATCHED FILTER FOR SPREAD SPECTRUM

This application is a continuation of Ser. No. 08/450,312, filed May 25, 1995 now U.S. Pat. No. 5,627,855.

1. Background of the Invention

This invention relates to spread spectrum communications, and more particularly to a programmable matched filter which can be used for despreading a pilot-chip-code-sequence signal and a message-chip-code-sequence signal.

2. Description of the Relevant Art

Spread spectrum communications require that an incoming spreading chip-code sequence embedded in a spread-spectrum signal, and the local spreading chip-code sequence at a receiver, be phase synchronized prior to processing of information transfer. Phase synchronization of the spreading chip code sequences is commonly known as code acquisition. Code acquisition is one of the most difficult issues facing the system designer.

Code acquisition is followed by the tracking process. Due to imperfect frequency references the incoming spreading chip-code sequence and the local spreading chip-code sequence tend to lose phase synchronization. Retaining the phase synchronization, or tracking, is a difficult process that typically employs feedback loops.

Conventional spread-spectrum systems implemented without the benefit of a matched filter employ additional circuits, such as delay locked loops (DLLs) dedicated to achieving and sustaining fine grained phase synchronization between the local spreading code and the incoming spreading code to within a unit of time which is less than the duration of one signal sample. The circuits for sustaining fine grain phase synchronization are difficult to design and implement.

In wireless environments, minimizing the performance degradation due to long or short duration attenuation of the incoming signal caused by changing propagation channel conditions is highly desirable. As the quality of the channel degrades, the quality of the detected signal degrades, often below acceptable levels.

Typical systems combat this condition by employing any of a variety of techniques collectively known as diversity processing. The diversity processing techniques have in common the ability to independently manipulate the information received through separate propagation paths, or channels, independently. The benefit from diversity processing is that when a given propagation channel degrades, the information can be recovered from signals received via other channels. A common though suboptimum, diversity technique is to employ two or more separate antennas and process the signal via two or more processing chains in parallel. Although necessary, the use of two or more antennas and processing is a difficult and costly undertaking, requiring two or more times the number of circuits required for one path as well as additional circuits and processing for insuring that the individual channel outputs are synchronized. A better approach is to employ a wideband signal of bandwidth W. If the multipath spread were $T_M$ then the receiver can recover $L=T_M(W+1)$ replicas of the incoming signal. If the receiver properly processed the replicas, then the receiver attains the performance of an equivalent $L^{th}$ order diversity communication system. For wideband systems the value of L can become very large and it becomes unfeasible to implement L processing paths. Thus a non-matched filter receiver can not attain the best possible performance.

The coherent demodulation of information signals requires that the phase of the carrier, at the radio frequency (RF), intermediate frequency (IF) or other frequency at which the demodulation is to take place, be known. The extraction of the phase of the carrier information requires that additional feedback loops be employed, such as phase-locked loops (PLLs), Costas loops, $n^{th}$ power loops or other devices capable of extracting the carrier phase information. In the wireless environment, where signals propagate through a multitude of separate and independent channels, each path processed by the receiver requires its own carrier phase information and therefore its own means to extract it. This requirement greatly increases the potential complexity of the system. The need to limit system complexity acts so as to limit the system performance.

Conventional receivers, for spread-spectrum reception or other coherent systems, employ circuits dedicated to extracting the carrier phase. These techniques, e.g., phase-locked loops (PLLs), Costas loops, $n^{th}$ power loops, etc., exhibit design and implementation complexities that are well documented throughout the professional literature. A separate and independent set of these circuits is implemented for each individual signal path, or channel, that is received. Practical limits on system complexity force the system to receive a small subset of the $L=T_M(W+1)$ independent signal replicas. Typically up to three such circuit sets can be practically implemented and thus only up to three independent signal replicas can be received and processed.

A complex matched filter consists of two identical branches, in-phase (I) and quadrature (Q), used to process in-phase and quadrature signals. Each branch consists of a local signal reference register, an incoming signal register, a multiplication layer and an adder tree. The multiplication layer and the adder tree contained in the in-phase and quadrature branches are identical and may contain the majority of the gates used to implement the matched filter. To implement a matched filter it is preferable to reduce the size of the structure as much as possible.

Processing multiple signals, whether QPSK or BPSK modulated, simultaneously by matched filtering is desirable. An example of a requirement for processing multiple signals is the simultaneous matched filter processing of a data signal and a pilot signal, from a spread-spectrum signal combining such signals. This normally requires the implementation of two or more matched filter structures, one per signal. Matched filters are large and difficult structures to build. Thus, limiting the size and complexity of the devices as much as possible is desirable.

SUMMARY OF THE INVENTION

A general object of the invention is a spread-spectrum receiver which reduces cost and circuit complexity, reduces the volume required and improves the performance, i.e., acquisition time, of conventional spread-spectrum chip-sequence signal acquisition.

Another object of the invention is a spread-spectrum receiver which has improved bit-error-rate (BER) performance over conventional coherent demodulation techniques, methods and circuits.

An additional object of the invention is to reduce cost and circuit complexity, reduce the volume required and improve the performance of conventional diversity reception, separation and combining techniques, methods and circuits.

A further object of the invention is to reduce the complexity associated with the simultaneous matched filter processing of multiple signals.

A still further object of the invention is to reduce the size and complexity associated with the implementation of complex in-phase matched filters and quadrature-phase matched filters.

According to the present invention, as embodied and broadly described herein, a spread-spectrum-matched-filter apparatus is provided including a code generator, a programmable-matched filter, a frame-matched filter, and a controller. The code generator is coupled to the programmable-matched filter and to the controller. The frame-matched filter is coupled to the output of the programmable-matched filter.

The spread-spectrum-matched-filter apparatus can be used as part of a spread-spectrum receiver, for receiving a received spread-spectrum signal. A received spread-spectrum signal, as used herein, is a spread-spectrum signal arriving at the input of the spread-spectrum receiver. The received spread-spectrum signal is assumed to include a pilot-spread-spectrum channel and a data-spread-spectrum channel. The pilot-spread-spectrum channel is generated from spread-spectrum processing a pilot-bit-sequence signal with a pilot-chip-sequence signal. The data-spread-spectrum channel is generated from spread-spectrum processing a data-bit-sequence signal with a data-chip-sequence signal.

The code generator generates a replica of the pilot-chip-sequence signal and a replica of the data-chip-sequence signal. The programmable-matched-filter has a programmable-impulse response which can be matched to a pilot-spread-spectrum channel or the data-spread-spectrum channel of the received spread-spectrum signal. The replica of the data-chip-sequence signal generated by the code generator is used to set or match the programmable-impulse response of the programmable-matched filter to the data-chip-sequence signal embedded in the received spread-spectrum signal. When matched, upon receiving the received spread-spectrum signal having the data-spread-spectrum channel embedded herein, the programmable-matched filter can detect and output a data-bit-sequence signal.

The replica of the pilot-chip-sequence signal generated by the code generator can set the programmable-impulse response of the programmable-matched filter to be matched to the pilot-chip-sequence signal embedded in the received spread-spectrum signal. With this setting, the programmable-matched filter can detect and output a despread-pilot-bit-sequence signal.

The frame-matched filter has a frame-impulse response which is matched to the pilot-bit-sequence signal. Accordingly, the frame-matched filter filters the despread-pilot-bit-sequence signal and generates, as an output, a peak-pilot-correlation signal in response to the despread-pilot-bit-sequence signal matching the frame-impulse response.

The controller controls to which of the programmable-impulse responses the programmable-matched filter is set. The controller can generate a pilot-control signal to cause the match of the programmable-impulse response of the programmable-matched filter to that of the pilot-chip-sequence signal embedded in the received-spread-spectrum signal. The controller also can generate a data-control signal to cause the programmable-impulse response of the programmable-matched filter to be matched to the data-chip-sequence signal of the received spread-spectrum signal. Timing to the controller can be from the peak-pilot-correlation signal generated at the output of the frame-matched filter. Thus, in response to the peak-pilot-correlation signal, using the data-control signal, the controller can cause the programmable-matched filter to be matched from the replica of the pilot-chip-sequence signal, to the pilot-chip-sequence signal. At a time delay from the peak-pilot-correlation signal, using the pilot-control signal, the controller can cause the programmable-matched filter to be matched from the replica of the data-chip-sequence signal, to the data-chip-sequence signal embedded in the received-spread-spectrum signal.

The present invention also includes a method for using a programmable-matched filter and a frame-matched filter as part of a spread-spectrum receiver on a received spread-spectrum signal. As with the spread-spectrum-matched-filter apparatus set forth above, the received spread-spectrum signal is assumed to include a pilot-spread-spectrum channel and a data-spread-spectrum channel. The pilot-spread-spectrum channel is generated from spread-spectrum processing a pilot-bit-sequence signal with a pilot-chip-sequence signal. The data-spread-spectrum channel is generated from spread-spectrum processing a data-bit-sequence signal with a data-chip-sequence signal.

The steps include generating a replica of the pilot-chip-sequence signal and a replica of the data-chip-sequence signal, and programming, using the replica of the pilot-chip-sequence signal and the replica of the data-chip-sequence signal, the programmable-matched filter to have an impulse response matched to either of the pilot-chip-sequence signal or the data-chip-sequence signal, respectively. When the programmable-matched filter is matched to the pilot-chip-sequence signal, the method includes the steps of despreading the pilot-spread-spectrum signal from the received spread-spectrum signal as a despread-pilot-bit-sequence signal, and filtering with the frame-matched filter the despread-pilot-bit-sequence signal and generating a peak-pilot-correlation signal.

When the programmable-matched filter is matched to the data-chip-sequence signal, the steps include despreading the data-spread-spectrum signal from the received spread-spectrum signal as a despread-data-bit-sequence signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
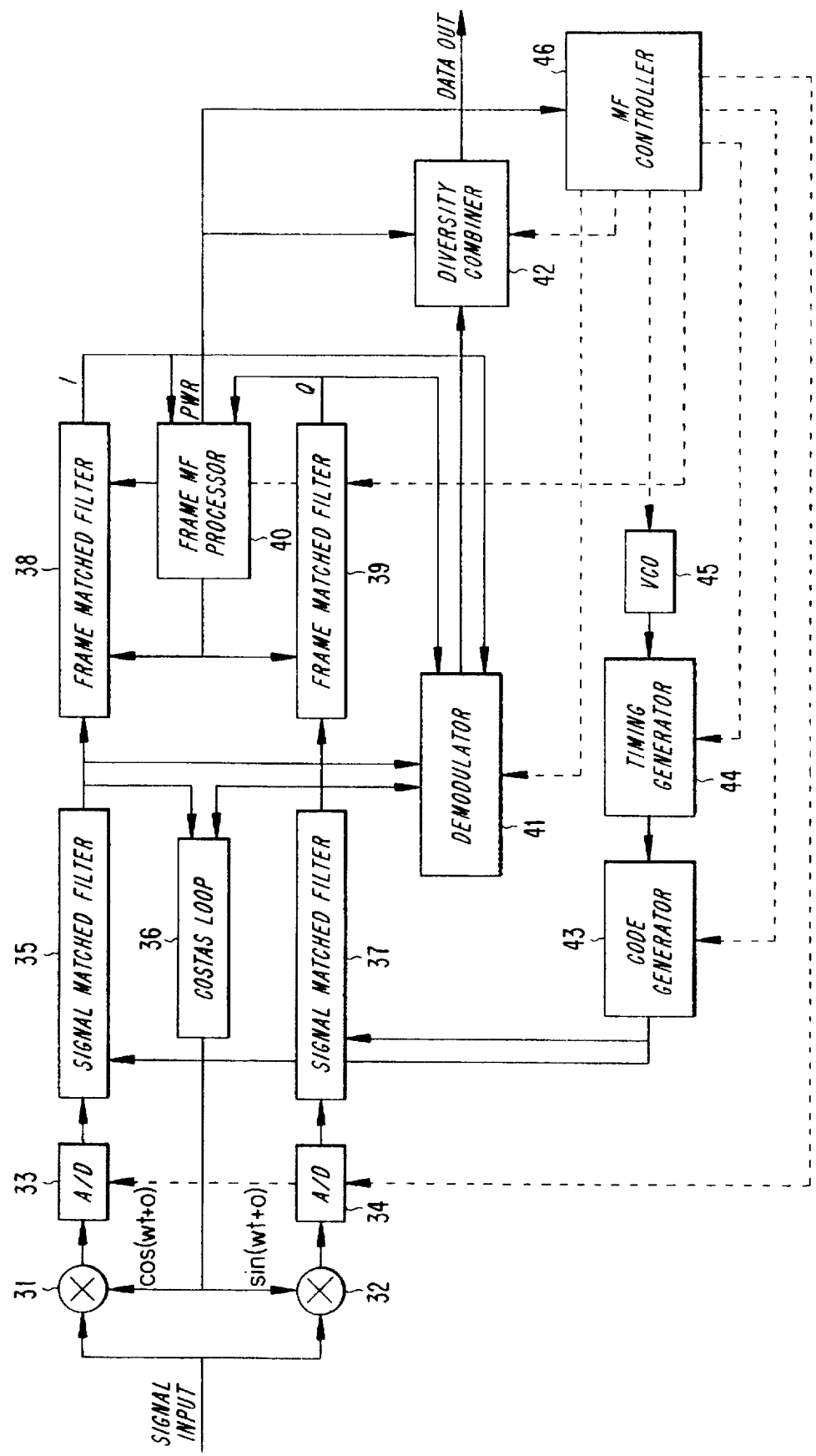
FIG. 1 is a block diagram of a signal-time-sharing, matched-filter-based demodulator.

Reference now is made in detail to the present preferred embodiments of the invention, examples of which are illustrated in the accompanying drawings, wherein like reference numerals indicate like elements throughout the several views.

The present invention provides a new and novel spread-spectrum-matched-filter apparatus which can be used as part of a spread-spectrum receiver on a received spread-spectrum signal. The received spread-spectrum signal is assumed to have a pilot-spread-spectrum channel and a data-spread-spectrum channel. The pilot-spread-spectrum channel is generated from spread-spectrum processing, by using techniques well known in the art, a pilot-bit-sequence signal with a pilot-chip-sequence signal. The pilot-bit-sequence signal may be a constant level, i.e., just a series of 1-bits, or a series of 0-bits, or alternating 1-bits and 0-bits, or other sequence as desired. Typically, data are not sent with a pilot-bit-sequence signal. In some applications, data, preferably with a low data rate, may be imposed on the pilot-bit-sequence signal. The pilot-chip-sequence signal is user defined, and in a usual practice, is used with a pilot-bit-sequence signal.

The data-spread-spectrum channel is generated similarly, from techniques well known in the art as used for the pilot-spread-spectrum channel, by spread-spectrum processing a data-bit-sequence signal with a data-chip-sequence signal. The data-bit-sequence signal may be derived from data, or analog signal converted to data, or other source of data bits. The data-chip-sequence signal can be user defined, and preferably is orthogonal to the pilot-chip-sequence signal, as is well known in the art.

Broadly, the spread-spectrum-matched-filter apparatus includes code means, programmable-matched means, frame-matched means, control means, and demodulator means. The control means is coupled to the code means and programmable-matched means. The frame-matched means is coupled to the output of the programmable-matched means. The demodulator means is coupled to the output of the programmable-matched means.

The code means generates a replica of the pilot-chip-sequence signal and a replica of the data-chip-sequence signal. These replicas of the pilot-chip-sequence signal and the data-chip-sequence signal are the same sequences as used for generating the received spread-spectrum signal which arrives at the input of the spread-spectrum-matched-filter apparatus. The code means can change over time the particular chipping sequence from which the replica of the pilot-chip-sequence signal and from which the replica of the data-chip-sequence signal are generated. Accordingly, the spread-spectrum-matched-filter apparatus can be used for a variety of pilot-chip-sequence signals and data-chip-sequence signals as generated by the code means, as might be used in a cellular-spread-spectrum architecture where a receiver might move from one geographical area to another. As the spread-spectrum-matched-filter apparatus moves from one geographical area to another, by way of example, a requirement might be imposed of having to change the pilot-chip-sequence signal and the data-chip-sequence signal in each of the different geographical areas.

The programmable-matched means has a programmable-impulse response. The programmable-impulse response can be set from the replica of the pilot-chip-sequence signal generated by the code means, and the replica of the data-chip-sequence signal generated by the code means. Thus, the programmable-impulse response may be set for filtering from the received spread-spectrum signal, the pilot-spread-spectrum channel. With the programmable-impulse response set to the replica of the pilot-chip-sequence signal, and with the pilot-spread-spectrum channel at the receiver, the programmable-matched means outputs a despread-pilot-bit-sequence signal.

When the programmable-matched means has the programmable-impulse response set from the replica of the data-chip-sequence signal, then the programmable-matched means filters from the received spread-spectrum signal, the data-spread-spectrum channel. Thus, the programmable-matched means can output the despread-data-bit-sequence signal. Accordingly, the programmable-matched means can despread either of the pilot-spread-spectrum channel or the data-spread-spectrum channel, depending on how the programmable-impulse response is set. As set forth below, the programmable-matched means changes dynamically, while receiving the received spread-spectrum signal, allowing the programmable-matched means to be time shared while receiving the pilot-chip-sequence signal and the data-chip-sequence signal.

The frame-matched means has a frame-pulse response matched to the pilot-bit-sequence signal. Thus, the frame-matched means filters the despread-pilot-bit-sequence signal from the programmable-matched means, and generates as a result thereof, a peak-pilot-correlation signal when the despread-pilot-bit-sequence signal matches the frame-impulse response. The frame-matched means may have a programmable-frame-impulse response, which might change between different geographical areas.

The control means controls the setting of the programmable-impulse response of the programmable-matched means. The control means can dynamically set the programmable-matched means, by using the replica of the pilot-chip-sequence signal generated by the code means, to match the pilot-chip-sequence signal embedded in the received spread-spectrum signal. Similarly, the control means can dynamically set the programmable-matched means, by using the replica of the data-chip-sequence signal generated by the code means, to match the data-chip-sequence signal. The control means can set the programmable-impulse response alternately, at various time delays, so that the programmable-matched means alternately detects the pilot-bit-sequence signal and the data-bit-sequence signal embedded in the received-spread-spectrum signal.

The programmable-matched means may include an in-phase-programmable-matched means and a quadrature-phase-programmable-matched means. The in-phase-programmable-matched means has an in-phase-programmable-impulse response which can be set from the replica of the pilot-chip-sequence signal or the replica of the data-chip-sequence signal generated by the code means. Depending on which setting the in-phase-programmable-matched means has, the in-phase-programmable-matched means despreads from the received spread-spectrum signal, an in-phase-component of the pilot-spread-spectrum signal channel as a despread-in-phase-component of the pilot-bit-sequence signal, or an in-phase component of the data-spread-spectrum channel as a despread-in-phase component of the data-bit-sequence signal.

The quadrature-phase-programmable-matched means has a quadrature-impulse response which can be set from the replica of the pilot-chip-sequence signal or the replica of the data-chip-sequence signal generated by the code means. When the quadrature-phase-programmable-matched means has the quadrature-impulse response matched to the pilot-chip-sequence signal, the quadrature-phase-programmable-matched means despreads from the received spread-spectrum signal a quadrature-phase component of the pilot-spread-spectrum channel as a despread-quadrature-phase component of the pilot-bit-sequence signal. Similarly, when the quadrature-phase-programmable-matched means has the quadrature-programmable-impulse response set from the replica of the data-chip-sequence signal, the quadraturephase-programmable-matched means despreads the received spread-spectrum signal as a quadrature-component of the data-spread-spectrum channel as a despread-quadrature-phase component of the despread data-bit-sequence.

In use, the control means has the in-phase-programmable-matched means and the quadrature-phase-programmable-matched means time synchronized so that they are alternatively matched to detect the pilot-chip-sequence signal or the data-chip-sequence signal. This dynamic changing of the in-phase-programmable-matched means and the quadrature-phase-programmable-matched means is done alternately during reception of a spread-spectrum signal, time sharing these elements for detecting the pilot-chip-sequence signal and the data-chip-sequence signal embedded in the received spread-spectrum signal. The frame-matched means may include an in-phase-frame-matched means and a quadrature-phase-frame-matched means. The in-phase-frame-matched means has an in-phase-frame-impulse response matched to an in-phase component of the pilot-bit-sequence signal. When the in-phase component of the despread-pilot-bit-sequence signal from the in-phase-programmable-matched means matches the in-phase-frame-impulse response, then an in-phase-peak-pilot-correlation signal is generated.

The quadrature-phase-frame-matched means has a quadrature-phase-frame-impulse response matched to a quadrature-phase component of the pilot-bit-sequence signal. When the quadrature-phase component of the despread-pilot-bit-sequence signal matches the quadrature-phase-frame-impulse response of the quadrature-phase-frame-matched means, then a quadrature-phase-peak-pilot-correlation signal is generated.

In the exemplary arrangement shown in FIG. 1, the code means is embodied as a code generator 43, the programmable-matched means is embodied as an in-phase-programmable-matched filter 35 and a quadrature-phase programmable-matched filter 37, the frame-matched means is embodied as an in-phase-frame-matched filter 38 and a quadrature-phase-frame-matched filter 39, the control means is embodied as a controller 46, and the demodulator means is embodied as a demodulator 41. The in-phase-programmable-matched filter 35 and the quadrature-phase-programmable-matched filter 37 may be constructed as digital-matched filters, surface-acoustic-wave devices, or as software embedded in a processor or as an application specific integrated circuit (ASIC). Also shown is a voltage controlled oscillator 45, timing generator 44, diversity combiner 42, frame processor 40, Costas loop 36 (or other generic tracking loop), in-phase analog-to-digital converter 33, quadrature-phase analog-to-digital converter 34, in-phase mixer 31, and quadrature-phase mixer 32. The in-phase analog-to-digital converter 33 is coupled between in-phase mixer 31 and in-phase-programmable-matched filter 35. The quadrature-phase analog-to-digital converter 34 is coupled between the quadrature-phase mixer 32 and the quadrature-phase-programmable-matched filter 37. The Costas loop 36 is coupled to the output of the in-phase-programmable-matched filter 35, to the demodulator 41, and to the in-phase mixer 31 and the quadrature-phase mixer 32. The in-phase-frame-matched filter 38 is coupled between the in-phase-programmable-matched filter 35 and the frame processor 40 and the demodulator 41. The quadrature-phase-frame-matched filter 39 is coupled between the quadrature-phase-programmable-matched filter 37 and the processor 40 and the demodulator 41. The code generator 43 is coupled between timing generator 44 and to the in-phase-programmable-matched filter 35 and the quadrature-phase-programmable-matched filter 37. The voltage controlled oscillator 45 is coupled to the timing generator 44 and to the matched-filter controller 46. The diversity combiner 42 is coupled to the frame processor 40 and the demodulator 41. The controller 46 is coupled to the frame processor 40. The prefixes "in-phase" and "quadrature-phase" denote that component, i.e., in-phase or quadrature-phase, of the received-spread-spectrum signal, with which the element operates.

For control, indicated by broken lines, the controller 46 is coupled to the diversity combiner 42, the frame-matched filter 38, the frame-matched filter 39, the demodulator 41, the timing generator 44, the code generator 43, the in-phase-analog-to-digital converter 33, and the quadrature-phase-analog-to-digital converter 34.

Referring to FIG. 1, a received spread-spectrum signal at the signal input is translated to an intermediate frequency or baseband frequency by in-phase mixer 31 and quadrature-phase mixer 32. For discussion purposes, the received-spread-spectrum signal is assumed to be translated to a baseband frequency. Thus, the baseband received spread-spectrum signal is converted to a digital signal by in-phase analog-to-digital converter 33 and quadrature-phase analog-to-digital converter 34. Thus, a baseband version of the received spread-spectrum signal is at the input of the in-phase-programmable-matched filter 35 and the quadrature-phase-programmable-matched filter 37.

The in-phase-programmable-matched filter 35 has an in-phase-programmable-impulse response which is set by the replica of the pilot-chip-sequence signal or the replica of the data-chip-sequence signal from code generator 43. Depending on the setting, the in-phase-programmable-matched filter 35 can despread the received spread-spectrum signal as a despread-in-phase component of the pilot-bit-sequence signal or as a despread-in-phase component of the data-spread-spectrum channel. Accordingly, the in-phase-programmable-matched filter 35 outputs either a despread-in-phase component of the pilot-bit-sequence signal, or a despread-in-phase component of the data-bit-sequence signal as a despread-data-bit-sequence signal.

Similarly, the quadrature-phase-programmable-matched filter 37 has a programmable-impulse response which can be set by the replica of the pilot-chip-sequence signal or the replica of the data-chip-sequence signal generated by the code generator 43. Depending on the setting, the quadrature-phase-programmable-matched filter 37 despreads the received spread-spectrum signal as a quadrature-phase component of the pilot-spread-spectrum channel or as a quadrature-phase component of the data-spread-spectrum channel. These can be either the despread-quadrature-phase-pilot-bit-sequence signal or the quadrature-phase-data-bit-sequence signal.

The in-phase-programmable-matched filter 35 and the quadrature-phase-programmable-matched filter 37 are ultimately controlled by the controller 46. The controller 46 controls timing and determines at desired timings when the code generator 43 sets the programmable-impulse responses of the in-phase-programmable-matched filter 35 and the quadrature-phase-programmable-matched filter 37 to the respective pilot-chip-sequence signal or the data-chip-sequence signal.

Figure 2:
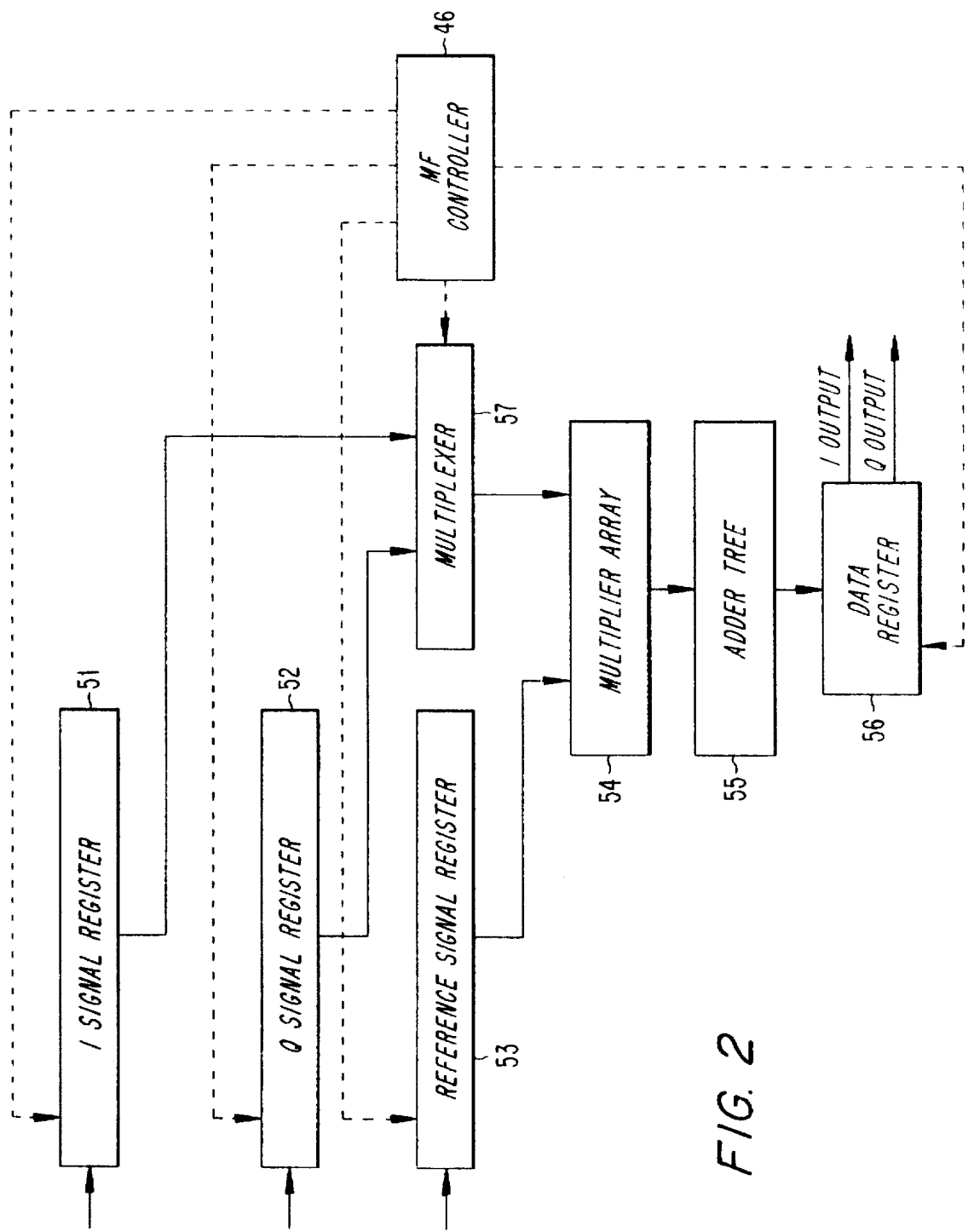
FIG. 2 illustrates a matched filter using time sharing of multiplier array and adder tree.

As shown in FIG. 2, the controller 46 controls the in-phase signal register 51 and the quadrature-phase signal register 52, which correspond to the in-phase-programmable-matched filter 35 and the quadrature-phase-programmable-matched filter 37, respectively.

In FIG. 1, the Costas loop 36 uses the output from the in-phase-programmable-matched filter 35 and the quadrature-phase-programmable-matched filter 37 to generate the cosine and sine signals for in-phase mixer 31 and quadrature-phase mixer 32, respectively.

When the in-phase-programmable-matched filter 35 and quadrature-phase-programmable-matched filter 37 have their respective programmable-impulse responses matched to the pilot-chip-sequence signal, then the output is a despread-pilot-bit-sequence signal. The despread-pilot-bit-sequence signal is passed through in-phase-frame-matched filter 38 and quadrature-phase-frame-matched filter 39, respectively. The in-phase-frame-matched-filter 38 has an in-phase-frame-impulse response matched to the in-phase component of the pilot-bit-signal, signal, and accordingly, generates an in-phase-peak-pilot correlation signal when the in-phase component of the despread-pilot-bit-sequence signal matches the in-phase-frame-impulse response. Similarly, the quadrature-phase-frame-matched filter 39 has a quadrature-phase-frame-impulse response matched to a quadrature-phase component of the pilot-bit-sequence signal. When the despread pilot-bit-sequence signal from the quadrature-phase-programmable-matched filter 37 matches the quadrature-phase-frame-impulse response of the quadrature-phase-matched filter 37, then the quadrature-phase-frame-matched filter outputs a quadrature-phase-peak-pilot-correlation signal. The in-phase-peak-pilot-correlation signal and the quadrature-phase-peak-pilot-correlation signal are demodulated by demodulator 47, and can be used as a initial timing signal for controlling when the diversity combiner 47 combines the output from the demodulator 41 for the respective signals from in-phase-programmable-matched filter 35 and the quadrature-phase-programmable-matched filter 37.

Additionally, the in-phase-peak-pilot-correlation signal and the quadrature-phase-peak-pilot-correlation signal can be processed by frame processor 40 to trigger a timing signal to controller 46 which actuates the timing for when a respective in-phase-programmable-impulse response and the quadrature-phase-programmable-impulse response of the in-phase-programmable-matched filter 35 and the quadrature-phase-programmable-matched filter 37, respectively are matched to either of the pilot-chip-sequence signal or the data-chip-sequence signal.

In a particular implementation of the present invention, in-phase-programmable-matched filter 35 and the quadrature-phase-programmable-matched filter 37 have their respective in-phase-programmable-impulse response and quadrature-phase-programmable-impulse response staggered, under the control of the controller 46, such that they are matched to the pilot-chip-sequence signal and then to the data-chip-sequence signal every five microseconds. Accordingly, each of the in-phase-programmable-matched filter 35 and the quadrature-phase-programmable-matched filter 37 can have their respective in-phase-programmable-impulse response and quadrature-phase-programmable-impulse response loaded within five microseconds. Typically, current designs have these respective programmable-matched filters loaded within 2.5 microseconds, for a system operating at 100 MHz, with each of the in-phase-programmable-matched filter 35 and the quadrature-phase-programmable-matched filter 37 having a 250 stage shift register.

The demodulator 41 can be implemented using coherent demodulation, or alternatively noncoherent demodulation.

The diversity combiner 42 combines in a variety of ways, such as maximum likelihood, straight combining, addition, or the demodulated outputs from the in-phase-programmable-matched filter 35 and the quadrature-phase-programmable-matched filter 37 as demodulated through demodulator 41.

FIG. 2 illustrates the matched filter using the time sharing of the multiplier array and adder tree. Shown in FIG. 2 are in-phase-signal register 51, quadrature-phase-signal register 52, reference-signal register 53, multiplier array 54, adder tree 55, data register 56, and controller 46. As shown, the dotted lines indicate that the controller 46 provides the necessary controlling of the in-phase-signal register 51, the quadrature-phase-signal register 52, the reference-signal reference 53 and the data register 56. The solid lines indicate the signal flow from the in-phase-signal register 51, the quadrature-phase-signal register 52, the reference-signal register 53 through multiplexer 57. The in-phase-signal register 51 and the quadrature-phase-signal register 52 are coupled through multiplexer 57 to multiplier array 54 to adder tree 55 to data register 56. The data register 56 has the in-phase output and quadrature-phase output.

Figure 3:
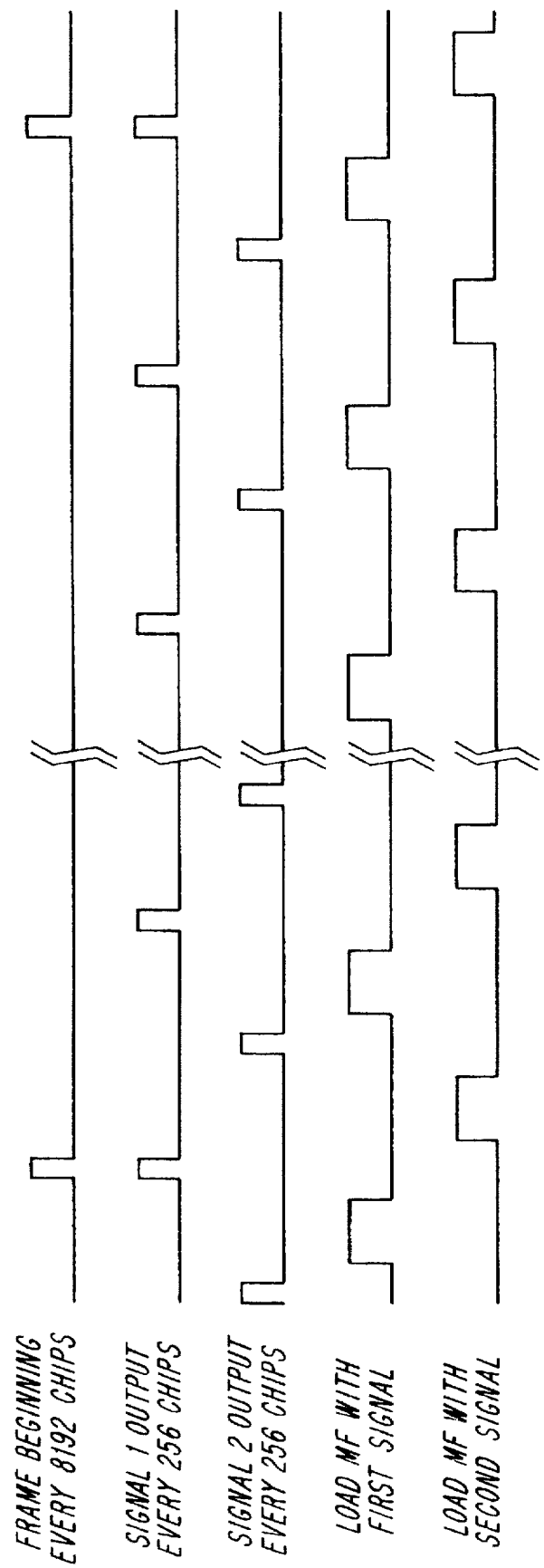
FIG. 3 shows possible timing of signal-time-sharing, matched-filter-based demodulator.

FIG. 3 illustrates block timing of the signal sharing, matched-filter-based correlator. As shown, a frame can begin every 8192 chips and a first signal, such as the pilot-chip-sequence signal can be output from the code generator 43 every 256 chips. Similarly, a second signal, such as a data-chip-sequence signal can be output every 256 chips, but staggered from the first signal, i.e., the pilot signal. Thus, the in-phase-programmable-matched filter 35 and the quadrature-phase-programmable-matched filter 37 are loaded with the first signal, the pilot-chip-sequence signal, and then staggered and loaded with the second signal, the data-chip-sequence signal. The first signal would represent loading the respective matched filters with the pilot-chip-sequence signal and the second signal would be the timing for loading the respective matched filters with the data-chip-sequence signal.

The present invention also includes a method which uses a programmable-matched filter and a frame-matched filter with a spread-spectrum receiver on a received spread-spectrum signal. As with the apparatus previously disclosed, the received spread-spectrum signal is assumed to have a pilot-spread-spectrum channel and a data-spread-spectrum channel. The pilot-spread-spectrum channel is generated from spread-spectrum processing a pilot-bit-sequence signal with a pilot-chip-sequence signal. The data-spread-spectrum channel is generated from spread-spectrum processing a data-bit-sequence signal with a data-chip-sequence signal.

The method comprises the steps of generating a replica of the pilot-chip-sequence signal and a replica of the data-chip-sequence signal. In response to the currents of a peak-pilot correlation signal, at an appropriate delay, the method generates a pilot-control signal. In response to the pilot-control signal, the method programs the programmable-matched filter with the replica of the pilot-chip-sequence signal to set the programmable-matched filter to have a programmable-impulse response matched to the pilot-chip-sequence signal. With the programmable-matched filter matched to the pilot-chip-sequence signal, the method despreads the pilot-spread-spectrum channel from the received spread-spectrum signal as a despread pilot-bit-sequence signal.

The frame-matched filter has a frame-impulse response matched to the pilot-bit-sequence signal. The method therefore uses the frame-matched filter to filter the despread pilot-bit-sequence signal. The method thereafter generates from the filtered despread-pilot-bit-sequence signal, the peak-pilot-correlation signal in response to the despreadpilot-bit-sequence signal matching the frame-impulse response of the frame-matched filter.

The method also generates at a time delay from the pilot-control signal, and in response to the peak-pilot-correlation signal, a data-control signal. In response to the data-control signal, the method programs the programmable-matched filter with the replica of the data-chip-sequence signal so that the programmable-matched filter has the programmable-impulse response matched to the data-chip-sequence signal. The method thereby despreads, while the programmable-matched filter is matched to the data-chip-sequence signal, the data-spread-spectrum channel from the received spread-spectrum signal as a despread-data-bit-sequence signal.

The method as described herein may be extended to in-phase and quadrature-phase components of a received-spread-spectrum signal. As such, the method would have the step of despreading the pilot-spread-spectrum channel from the received spread-spectrum signal including the steps of despreading, from the received spread-spectrum signal, the in-phase component of the pilot-spread-spectrum channel as a despread in-phase component of the pilot-bit-sequence signal, and despreading, from the received spread-spectrum signal, the quadrature-phase component of the pilot-spread-spectrum channel as a despread-quadrature-phase component of the pilot-bit-sequence signal.

Similarly, the in-phase component and the quadrature-phase component of the received-spread-spectrum signal can be despread as in-phase components and quadrature-phase components of the data-spread-spectrum channel. Accordingly, the method would include despreading, from the received spread-spectrum signal, an in-phase component of the data-spread-spectrum channel as a despread-in-phase component of the despread-data-bit-sequence signal. The method would also include despreading, a quadrature-phase component of the data-spread-spectrum channel as a despread-quadrature-phase component of the despread-data-bit-sequence signal.

When filtering the despread pilot-bit-sequence signal into in-phase components and quadrature-phase components of the despread-pilot-bit-sequence signal, the method can also include generating an in-phase-peak-pilot-correlation signal and a quadrature-phase-peak-pilot-correlation signal, in response to the in-phase component and the quadrature-phase component of the despread pilot-bit-sequence signal matching the in-phase-frame-impulse response and the quadrature-phase-frame-impulse response, respectively.

In operation the in-phase-programmable-matched filter 35 and the quadrature-phase-programmable-matched filter 37 are loaded with M local sequence symbols, i.e., either the replica of the pilot-chip-sequence signal or the replica of the data-chip-sequence signal. The incoming received spread-spectrum signal samples generated by in-phase-analog-to-digital converter 33 and quadrature-phase-analog-to-digital converter 34, respectively, slide by, i.e. are correlated against, the local replicas until they line up, at which time a large information bearing output is produced. The generation of this large output does not require that a synchronization process be successfully completed a priori or that additional circuits dedicated to the acquisition process be employed and it achieves code synchronization in the shortest possible time to acquire the incoming spreading chip-sequence signal. This has the advantage of lower implementation cost, lower physical volume, less power consumption, more rapid implementation and much better performance as measured by the time required to achieve code synchronization.

The presence of a strong signal level output indicates that at that specific moment in time M incoming signal symbols and the M symbols of the local spreading code, i.e. chip-sequence signal, loaded in the in-phase-programmable-matched filter 35 and the quadrature-phase-programmable-matched filter 37 are in alignment. The requirement exists that the in-phase-programmable-matched filter 35 and the quadrature-phase-programmable-matched filter 37 be fully loaded with the next M symbols of the local spreading code, the pilot-chip-sequence signal or the data-chip-sequence signal at any time prior to the arrival of the next M incoming signal symbols at the in-phase-programmable-matched filter 35 and the quadrature-phase-programmable-matched filter 37. The value of the number M, which denotes the size of the respective programmable-matched filter as measured in number of signal samples, is much larger than any value on the order of one; in the present embodiment M is on the order of 250. Because M is much larger than one the circuits required to implement the code phase synchronization functions are much easier to design and implement. This has the advantage of lower implementation cost, lower physical volume, less power consumption, more rapid implementation and inherently better performance.

The in-phase-programmable-matched filter 35 and the quadrature-phase-programmable filter 37 identify, characterize and extract the information which arrives through all available channels, or paths, intrinsically without any additional and parallel signal processing paths. The spreading code loaded as a local reference in the in-phase-programmable-matched filter 35 and the quadrature-phase-programmable-matched filter 37 remain in place until all propagation channels have the opportunity to deliver the information signal at the in-phase-programmable-matched filter 35 and the quadrature-phase-programmable-matched filter 37; the matched filter can then easily recover all $L=T_M(W+1)$ signals it is capable of receiving. As the input signals are offset in time due to differences in length of the propagation path, and since the in-phase-programmable-matched filter 35 and the quadrature-phase-programmable-matched filter 37 are linear devices, the outputs due to the signals propagation through different channels are output by the in-phase-programmable-matched filter 35 and the quadrature-phase-programmable-matched filter 37 offset in time. Thus the reception and separation of the signals propagating through different channels does not require any additional circuits and the individual signals, which are now separate in time can be easily individually manipulated and combined in optimum ways such that the matched filter receiver attains the performance of a L-diversity system.

A receiver capable of identifying, separating and combining large numbers (L) of signal replicas propagating through different channels is referred to as a RAKE receiver. The RAKE receiver structure is optimal and the matched filter can implement it without the excessive complexity incurred by alternative system implementations. The in-phase-programmable-matched filter 35 and the quadrature-phase-programmable-matched filter 37 implementation of the heart of the diversity processing system has the advantage of lower implementation cost, lower physical volume, less power consumption, more rapid implementation, less complex control and better performance.

The programmable-matched-filter-based demodulator as described herein utilizes only one such set of circuits and, using information which is intrinsically generated, can then coherently demodulate any number of signal replicas, including all $L=T_M(W+1)$, that arrive via separate propagation paths. The mechanism by which this is accomplished is to employ one conventional phase tracking circuit, e.g., phase-locked loop (PLLs), Costas loop 36, or $n^{th}$ power loop, in order to establish a temporarily stable phase reference and then extract the phase offset of each individual signal with respect to that phase reference. The incoming signal is first downconverted non-coherently to some frequency, including the 0 Hz frequency (DC). Then the in-phase and quadrature-phase channel outputs are read from the in-phase-programmable-matched filter 35 and the quadrature-phase-programmable-matched filter 37, respectively. The phase offset of the carrier signal is contained in the relative amplitudes of the in-phase and quadrature-phase outputs which are then used directly to demodulate the received data signal in a differential mode. Alternatively the phase estimate of the individual propagation paths can be improved by further matched filtering to demodulate the signal with performance equal to or better than that obtained using conventional coherent demodulators but without the added complexity introduced by conventional coherent demodulators. Therefore the programmable-matched filter-based implementation has the advantage of much lower complexity, lower implementation cost, lower physical volume, less power consumption, more rapid implementation and better performance.

A set of multipliers and the associated adder tree may be eliminated. By inputting the signals at the input of the remaining set of multipliers and the associated adder tree from two multiplexers, each multiplexer may serve to connect to the multiplier/adder tree structure either the in-phase or quadrature-phase signal registers. This implementation adds the complexity of two multiplexers and reduces the complexity associated with a set of multipliers and an adder tree for a significant net reduction in complexity.

The programmable-matched filter is a digital signal processor, the output of which is of interest only at that instant of time when the portion of interest of the incoming signal is fully loaded and is of no interest at any other time. In the present implementation the size of the programmable-matched filters is approximately 250 stages and it requires 250 clock cycles to load the input samples of the received spread-spectrum signal. Its output is of interest only for one or two clock cycles and is of no interest for the rest of approximately 248 clock cycles. Thus the circuit can be reused during these 248 clock cycles. Two or more signals, say N signals, can utilize the same matched filter provided that the signals are not lined up in phase and thus the outputs are staggered in time. If N=5 signals must share the same matched filter, the signals could then be staggered by approximately 45 clock cycles and the matched filter could be operated in a number of ways, including the following manner:

1. Starting at clock cycle 5, the programmable-matched filters are loaded with the reference corresponding to the first signal. The output due to the first signal will occur during the $50^{th}$ and $51^{st}$ clock cycle.
2. Starting at clock cycle 55, the programmable-matched filters are loaded with the reference corresponding to the second signal. The output due to the second signal will occur during the $100^{th}$ and $101^{st}$ clock cycle.
3. Starting at clock cycle 105, the programmable-matched filters are loaded with the reference corresponding to the third signal. The output to the third signal will occur during the $150^{th}$ and $151^{st}$ clock cycle.
4. Starting at clock cycle 155, the programmable-matched filters are loaded with the reference corresponding to the fourth signal. The output due to the fourth signal will occur during the $200^{th}$ and $201^{st}$ clock cycle.
5. Starting at clock cycle 205, the programmable-matched filters are loaded with the reference corresponding to the fifth signal. The output due to the fifth signal will occur during the $250^{th}$ and $215^{st}$ clock cycle.

The cycle then repeats itself for the next output due to the first, second, third, fourth and fifth signals using only one matched filter. The complexity of and size of implementation is reduced by 80% while the signal processing benefits remain constant.

It will be apparent to those skilled in the art that various modifications can be made to the spread-spectrum-matched-filter apparatus of the instant invention without departing from the scope or spirit of the invention, and it is intended that the present invention cover modifications and variations of the spread-spectrum-matched-filter apparatus provided they come within the scope of the appended claims and their equivalents.

I claim:

1. A method, using a programmable-matched filter and a frame-matched filter with a spread-spectrum receiver on a received spread-spectrum signal, the received spread-spectrum signal having a pilot-spread-spectrum channel generated from spread-spectrum processing a pilot-bit-sequence signal with a pilot-chip-sequence signal and a data spread-spectrum channel generated from spread-spectrum processing a data-bit-sequence signal with a data-chip-sequence signal, comprising the steps of:

programming said programmable-matched filter, responsive to a pilot-control signal, to set said programmable-matched filter to having a programmable-impulse response matched to the pilot-chip-sequence signal;

despreading, with the programmable-matched filter matched to the pilot-chip-sequence signal, the pilot-spread-spectrum channel as a despread-pilot-bit-sequence signal;

filtering, with said frame-matched filter having a frame-impulse response matched to the pilot-bit-sequence signal, the despread-pilot-bit-sequence signal;

generating from the filtered despread-pilot-bit-sequence signal, responsive to the despread-pilot-bit-sequence signal matching the frame-impulse response of the frame-matched filter, a peak-pilot-correlation signal;

generating, responsive to the peak-pilot-correlation signal, at a time delay from the pilot-control signal, a data-control signal;

programming said programmable-matched filter, responsive to the data-control signal, to have the programmable-impulse response matched to the data-chip-sequence signal; and despreading, with the programmable-matched filter matched to the data-chip-sequence signal, the data-spread-spectrum channel as a despread-data-bit-sequence signal.

2. The method as set forth in claim 1, with the step of despreading the pilot-spread-spectrum channel further including the steps of:

despreading, from the received spread-spectrum signal, an in-phase component of the pilot-spread-spectrum channel as a despread-in-phase component of the despread-pilot-bit-sequence signal; and despreading, from the received spread-spectrum signal, a quadrature-phase component of the pilot-spread-spectrum channel as a despread-quadrature-phase component of the despread-pilot-bit-sequence signal.

3. The method as set forth in claim 1 or 2 with the step of despreading the data-spread-spectrum channel further including the steps of:

despreading, from the received spread-spectrum signal, an in-phase component of the data-spread-spectrum channel as a despread-in-phase component of the despread-data-bit-sequence signal; and despreading, from the received spread-spectrum signal, a quadrature-phase component of the data-spread-spectrum channel as a despread-quadrature-phase component of the despread-data-bit-sequence signal.

4. The method as set forth in claim 2 with the step of filtering the despread pilot-bit-sequence signal further including the steps of:

generating an in-phase-peak-pilot-correlation signal in response to the despread-in-phase component of the despread-pilot-bit-sequence signal matching an in-phase-frame-impulse response; and generating a quadrature-phase peak-pilot-correlation signal in response to the despread-quadrature-phase component of the despread-pilot-bit sequence signal matching a quadrature-phase-frame-impulse response.

5. The method as set forth in claim 2 further including the step of demodulating an in-phase component of the despread-data-bit-sequence signal and a quadrature-phase component of the despread-data-bit-sequence signal, as a received-data-bit-sequence signal.

6. The method as set forth in claim 1, further including the step of demodulating the despread-data-bit-sequence signal as a received data-bit-sequence signal.

7. A method, using a programmable-matched filter having a first plurality of taps and a frame-matched filter having a second plurality of taps with a spread-spectrum receiver on a received spread-spectrum signal to generate a code having a first plurality of chips, the first plurality of chips being equal to a product of the first plurality of taps and the second plurality of taps, the received spread-spectrum signal having a pilot-spread-spectrum channel generated from spread-spectrum processing a pilot-bit-sequence signal with a pilot-chip-sequence signal and a data spread-spectrum channel generated from spread-spectrum processing a data-bit-sequence signal with a data-chip-sequence signal, the pilot-chip-sequence signal and the data-chip-sequence signal being different from each other, comprising the steps of:

generating a replica of the pilot-chip-sequence signal;

generating a replica of the data-chip-sequence signal;

generating, responsive to a peak-pilot correlation signal, a pilot-control signal;

programming said programmable-matched filter to set the first plurality of taps of said programmable-matched filter to have a programmable-impulse response matched to the pilot-chip-sequence signal;

despreading the pilot-spread-spectrum channel as a despread-pilot-bit-sequence signal, each bit of the despread-pilot-bit-sequence having a second plurality of chips, a number of the second plurality of chips being equal to a number of the first plurality of taps;

outputting, on the basis of one output for every second plurality of chips, the despread-pilot-bit-sequence signal to the frame-matched filter;

filtering, with said frame-matched filter having a frame-impulse response matched to the pilot-bit-sequence signal, the despread-pilot-bit-sequence signal, each of the second plurality of taps of said frame-matched filter for correlating with a respective bit of the despread-pilot-bit-sequence signal;

generating a peak-pilot-correlation signal in response to a frame of the despread-pilot-bit-sequence signal matching the frame-impulse response of the frame-matched filter;

programming said programmable-matched filter, responsive to the peak-pilot-correlation signal, to have the programmable-impulse response matched to the data-chip-sequence signal; and despreading the data-spread-spectrum channel as a despread-data-bit-sequence signal.

8. The method as set forth in claim 7, with the step of despreading the pilot-spread-spectrum channel further including the steps of:

despreading an in-phase component of the pilot-spread-spectrum channel as a despread-in-phase component of the despread-pilot-bit-sequence signal; and despreading a quadrature-phase component of the pilot-spread-spectrum channel as a despread-quadrature-phase component of the despread-pilot-bit-sequence signal.

9. The method as set forth in claim 7 or 8 with the step of despreading the data-spread-spectrum channel further including the steps of:

despreading an in-phase component of the data-spread-spectrum channel as a despread-in-phase component of the despread-data-bit-sequence signal; and despreading a quadrature-phase component of the data-spread-spectrum channel as a despread-quadrature-phase component of the despread-data-bit-sequence signal.

10. The method as set forth in claim 8 with the step of generating a peak-pilot-correlation signal further including the steps of:

generating an in-phase-peak-pilot-correlation signal in response to the despread-in-phase component of the despread-pilot-bit-sequence signal matching an in-phase-frame-impulse response; and generating a quadrature-phase peak-pilot-correlation signal in response to the despread-quadrature-phase component of the despread-pilot-bit sequence signal matching a quadrature-phase-frame-impulse response.

11. The method as set forth in claim 8 further including the step of demodulating an in-phase component of the despread-data-bit-sequence signal and a quadrature-phase component of the despread-data-bit-sequence signal, as a received-data-bit-sequence signal.

12. The method as set forth in claim 7, further including the step of demodulating the despread-data-bit-sequence signal as a received data-bit-sequence signal.

* * * * *